Patented Feb. 11, 1930

1,747,119

UNITED STATES PATENT OFFICE

WILLIAM B. LERCH, OF BARTLESVILLE, OKLAHOMA, ASSIGNOR OF ONE-HALF TO JACK STEWART DEWAR, OF BARTLESVILLE, OKLAHOMA

PROCESS AND PRODUCT FOR TREATING EMULSIONS OF MINERAL OILS

No Drawing. Application filed May 31, 1928. Serial No. 282,039.

This invention relates to an improved demulsifying agent for resolving stable hydrocarbon emulsions.

The primary object of this invention is the provision of an improved demulsifying agent for breaking up and preventing the formation of hydrocarbon emulsions, which consists in sulphonating highly unsaturated hydrocarbons of the polyolefine, cyclopentene and cyclohexene series.

A further object of this invention is the provision of an improved treatment of emulsions of mineral oil and water, such as petroleum emulsions, for the purpose of separating the oil from the water, which consists in the admixing of an improved and economically produced demulsifier, preferably formed by sulphonating highly unsaturated hydrocarbons, such as tars of the polyolefine, cyclopentene and cyclohexene series. The demulsifier may be introduced direct into a producing well, in the manner set forth in the John D. Brady Patent #1,531,173, granted March 24, 1925; by feeding the improved demulsifier into storage tanks containing the "B. S." or "roily oil"; or introducing it into the lead line near the well, which method gives probably the most economical and expeditious results, on account of the time element which permits the chemical to act on the emulsion while flowing from the well to the flow tank, gun barrel or tank battery.

A further object of this invention is the provision of a demulsifying agent which may be used to resolve hydrocarbon emulsions of petroleum and water or brine, which may be economically provided by sulphonating Blau gas or Pintsch gas tars obtainable as a very cheap by-product in the manufacture of artificial illuminating gas.

Other objects and advantages of the invention will be apparent during the course of the following detailed description.

I have discovered that cheap demulsifying agents of the class described, which are very effective for the purpose, may be provided of such raw materials as Blau gas tars, Pintsch gas tars as are produced from clay retorts; certain coal tars, particularly those obtained by coking coals which have an appreciable alumina content in its ash or coals, coked by processes whereby the treatment is not too high to form appreciable quantities of aromatic hydrocarbons; and other hydrocarbons containing polyolefine, cyclopentene or cyclohexene series, such as may be formed in cracking petroleum products in the presence of clays containing alumina, such as shale tars. I prefer to select Blau gas tar as the most feasible, in view of its abundance and the economy with which it may be obtained, primarily because there is little or no commercial use for the same at present.

The above tars or raw materials are highly unsaturated hydrocarbons of the polyolefine, cyclopentene or cyclohexene series, and they are divisible into two groups, as follows:

First, the highly reactive tars, which are readily absorbable by sulphuric acid, as for instance the cyclopentene series.

Second, the very highly reactive hydrocarbons, as for instance those of the cyclopentadienes or methylene cyclopentenes.

The above tars are sulphonated by the addition of sulphuric acid. To the first group or highly reactive tars, the sulphuric acid is added to form alkyl acid sulphonates or alkyl poly acid sulphonates. Subsequent to the sulphonation of the first group, the second group, or the very highly reactive hydrocarbons, is added to react with the remaining hydrogen in the alkyl acid sulphonate to give as high a yield of dialkyl-polysulphonates as is possible to obtain.

According to the raw material which is used, in sulphonation treatment, if there is, subsequent to the above mixing of ingredients, remaining any acid hydrogen, the same may be removed by neutralization with a satisfactory neutralizing base, such as calcium, sodium, or ammonium compounds. The amount of neutralizing agent to cause neutralization will be less than one-half the equivalent of the amount of hydrogen in the acid at the beginning of the process of sulphonating.

The resultant product may then be readily emulsified with various quantities of water and it is also oil soluble.

If the process of sulphonating and neutralizing is carried out with careful attention, it will not be necessary to wash the resulting product with water, so that the demulsifying agent is complete without the addition of other ingredients.

The residue tars are used in the unrefined state in which they are received as by-products of whatever manufacture produces the same. Unrefined coal gas tars are just as desirable as Blau gas tars, provided they have been produced under the conditions above mentioned. The Blau gas tars may be made from petroleum gas oils, or the destructive distillation of coal; there being practically no difference in the resulting tars, so far as desirability in a demulsifying agent is concerned, since in both instances the oils or coals are decomposed and the tars formed in the presence of alumina.

As a preferred process in the provision of demulsifying agent from Blau gas tars, I prefer to use the following ingredients and their respective proportions:—

Heavy Blau gas tar_____ 1 part
Sulphuric acid_____ 3 parts
Light Blau gas tar_____ 7 parts The heavy Blau gas tar, or unsaturate, is sulphonated in the cold about 40° centigrade, by adding the sulphuric acid thereto very slowly while stirring constantly. After several hours of such stirring or agitation, it will be found that the sulphuric acid reacting with the heavy tar unsaturates gives alkyl sulphonates, which is an ester of sulphuric acid in which an oxygen is between the carbon and the sulphur. Subsequently the light unsaturates, that is, the light Blau gas tar, is added very slowly with continued stirring at a temperature of 40° centigrade, as before. The mixture is agitated several hours. The addition of the light unsaturates causes the remaining hydrogen to form a dialkyl sulphonate and the mixture may then be neutralized, and washed if found necessary. No heat treatment is necessary during the formation of the demulsifying agent.

I have found that it may add to the efficiency of the demulsifying agent, above described in detail, by the addition of 1%, by weight, of calcium oleate, although this is not necessary.

I have found that if in addition to sulphonating the unsaturated hydrocarbon there is also added cresol or cresylic acid that a very powerful demulsifying agent is provided. While it is within the scope of my invention to use such ingredients in various proportions with light and heavy tars and sulphuric acid, yet I have found that the following ingredients are very desirable in providing a demulsifying agent:—

Light tar_____ 1 part
Heavy tar_____ 5 parts
Cresol or cresylic acid_____ 3 parts
Sulphuric acid_____ 2½ parts The sulphuric acid is mixed and thoroughly agitated with the heavy unsaturate (tar), under low temperature conditions (about 40° centigrade) slowly and with continuous stirring, for several hours. The cresol or cresylic acid may be added before, during, or after the sulphonating step, but the essential feature in the process is that of first sulphonating the heavy tar and later the light tar in the same relation as described in the above sulphonating process. I have found that if as much as 5% cresol or cresylic acid is added to the tars, before, during, or after the sulphonating process, some sort of a decomposition takes place, after which it is absolutely impossible to detect the presence of such acids in the finished product.

The improved demulsifying agent may be fed into the hydrocarbon emulsions either straight, or diluted with water or oil in varying proportions, according to the character of the emulsion being treated. As in zero weather the chemical may be somewhat viscous, it may be desirable to thin the same, by warming it, or diluting it with kerosene, crude oil, or the like.

From the foregoing description of this invention it is apparent that an improved demulsifying agent for resolving petroleum emulsions of oil and water has been provided, which contemplates the economical provision of the same by sulphonating tars of a character which will enable the production of a high yield of dialkyl-polysulphonates. In a more specific sense it is highly desirable to provide an economical demulsifying agent by specifically sulphonating Blau gas tars to produce the dialkyl-polysulphonates, but as above mentioned other tars are suitable, such as Pintsch gas tars, shale tars, and coal tars possessing the characteristics above outlined.

By way of example the product has been used for treating emulsions of mineral oils on a commercial scale in the Panhandle field, at Hutchinson County, Texas. The crude oil produced in this area, although of fairly high gravity, averaging 38° A. P. I., contains an unusually high sulphur content substantially one-half of one per cent, together with quantities of wax; the same being a paraffin-naphthene or mixed base crude oil. Considerable quantities of crude oil in an emulsified condition are produced in this area, some of which are particularly difficult to resolve into oil and water. In a comparative sense, on a property producing three hundred to three hundred and twenty-five barrels of pipe line oil per twenty-four hours, the total emulsified product before treatment averaged about 25% of the total production. Using a conventional and commercial demulsifier, it was found that there was required about a minimum of 2½ gallons of such demulsifier per day. For a period of four days my product was substituted. It was found to require but two gallons of my chemical to cause a complete and clean resolution of the demulsified petroleum, instead of two and one-half gallons under like comparative conditions of the commercially obtainable product. Other tests have been conducted with my improved demulsifier on other leases such as in the Seminole oil fields of Oklahoma, the Burbank field of Oklahoma and various Kansas oil fields, with like results. The above tests were fairly made, and demonstrated that my improved demulsifier is as good or better than commercial articles now obtainable. In addition, less of my demulsifier is required, and under present market conditions it may be produced at a lower cost than commercially obtainable demulsifiers.

Various changes in the character, amount, and manner of mixing the ingredients may be made in providing the improved demulsifying agent, without departing from the scope of the invention within the limits of the claims.

I claim:

1. A process for resolving petroleum emulsions which consists in subjecting such emulsion to the action of a demulsifying agent comprising dialkyl-polysulphonates.

2. A process for resolving petroleum emulsions which consists in subjecting such emulsion to the action of a demulsifying agent comprising dialkyl-polysulphonates, specifically formed by sulphonating Blau gas tar.

3. A process for breaking or separating petroleum emulsions, characterized by subjecting the emulsion to the action of a treating agent composed of a sulphonated highly unsaturated tar.

4. A process for breaking or separating petroleum emulsions, characterized by subjecting the emulsion to the action of a treating agent composed of a sulphonated Blau gas tar.

5. A process for resolving petroleum emulsions which consists in subjecting such emulsion to the action of a demulsifying agent composed of sulphonated Blau gas tar obtained as residue from the manufacture of Blau gas from mineral oil.

6. A process for resolving petroleum emulsions which consists in subjecting such emulsion to the action of a demulsifying agent which is produced by sulphonating a highly unsaturated hydrocarbon capable of producing a high yield of dialkyl-polysulphonates.

7. A process of treating petroleum emulsions which consists in feeding into the petroleum emulsion a demulsifying agent prepared by the sulphonating of Blau gas tars produced as a by-product in the manufacture of illuminating gas from mineral oil.

8. A process for resolving hydrocarbon emulsions which consists in feeding into the emulsions a demulsifying agent prepared by sulphonating highly unsaturated hydrocarbons of the polyolefine, cyclopentene and cyclohexene series.

9. A process for breaking or separating petroleum emulsions, characterized by subjecting the emulsion to the action of a demulsifying agent comprising a reaction product of the following:

Heavy Blau gas tar_____ 1 part
Sulphuric acid_____ 3 parts
Light Blau gas tar_____ 7 parts 10. A process for breaking or separating petroleum emulsions characterized by subjecting the emulsions to the action of a treating agent derived from a reaction of heavy Blau gas tar, light Blau gas tar, and sulphuric acid.

11. A process for breaking or separating petroleum emulsions characterized by subjecting the emulsions to the action of a treating agent derived from a reaction of heavy Blau gas tar, light Blau gas tar, sulphuric acid, and cresylic acid.

12. A demulsifying agent of the class described consisting of sulphonated tar containing a high yield of dialkyl-polysulphonates.

13. The process of providing a hydrocarbon emulsion demulsifying agent which consists in reacting sulphuric acid and a highly unsaturated tar capable of forming with the sulphuric acid a high yield of dialkyl-polysulphonates.

14. A demulsifying agent of the class described prepared by reacting sulphuric acid, tar capable of forming with the sulphuric acid a high yield of dialkyl polysulphonates, and cresylic acid.

15. The process of preparing a demulsifying agent of the class described which consists of reacting heavy Blau gas tar with sulphuric acid and subsequently reacting therewith light Blau gas tar.

16. The process of preparing a demulsifying agent of the class described which consists of reacting heavy Blau gas tar with sulphuric acid and reacting therewith light Blau gas tar, and cresylic acid.

17. A demulsifying agent comprising a reaction product of sulphuric acid with Blau gas tar specifically those obtained as a by-product or residue tar in the manufacture of Blau gas from mineral oil.

18. The process of preparing a demulsifying agent which consists in reacting sulphuric acid with a highly unsaturated heavy Blau gas tar while at a temperature of substantially 40° C., agitating and thoroughly stirring the same, and subsequently adding thereto highly unsaturated light Blau gas tar and thoroughly mixing and stirring.

19. The process of preparing a demulsifying agent which consists in mixing sulphuric acid with highly unsaturated heavy Blau gas tar while at a temperature of substantially 40° C. agitating and thoroughly stirring the same, subsequently adding thereto highly unsaturated light Blau gas tar and thoroughly mixing and stirring, and subsequently neutralizing the mixture.

20. The process of preparing a demulsifying agent for resolving hydrocarbon emulsions which consists in sulphonating tar capable of producing a high yield of dialkyl-polysulphonates, and subsequently neutralizing any acid hydrogen present.

21. The process of preparing a demulsifying agent for resolving hydrocarbon emulsions which consists in sulphonating tar capable of producing a high yield of dialkyl-polysulphonates, and subsequently neutralizing any acid hydrogen present by the addition of calcium carbonate.

22. A demulsifying agent for resolving hydrocarbon emulsions which consists in reacting together the following ingredients in their respective proportions:

Sulphuric acid_____ 3 parts
Heavy Blau gas tar_____ 1 part
Light Blau gas tar_____ 7 parts 23. The process of producing a demulsifying agent for resolving hydrocarbon emulsions which consists in sulphonating a readily absorbable tar such as Blau gas tar produced from mineral oil to form alkyl sulphonates, and subsequently adding a tar having like unsaturated ingredients to give a product having a high yield of dialkyl polysulphonates.

24. The process of producing a demulsifying agent for resolving hydrocarbon emulsions which consists in sulphonating a readily absorbable and highly reactive tar, such as Blau gas tar formed from mineral oil, to form alkyl sulphonates, and subsequently adding a tar having like unsaturated ingredients and sulphuric acid to give a product having a high yield of dialkyl polysulphonates, and subsequently neutralizing any acid hydrogen remaining.

25. A process for breaking up or separating petroleum emulsions characterized by subjecting the emulsions to the action of a treating agent formed by sulphonating highly unsaturated tar which is formed in the presence of alumina.

26. A demulsifying agent which consists in the product formed by reacting sulphuric acid with a by-product tar which has been formed in the presence of alumina.

27. A process for breaking and separating petroleum emulsions which is characterized by subjection to the action of a treating agent composed of a sulphonated highly unsaturated tar formed as a residue from petroleum oils.

28. A demulsifying agent prepared by the reaction of sulphuric acid with a residue tar formed as a by-product in the conversion of petroleum oils in the presence of alumina.

29. A process for breaking and separating petroleum emulsions characterized by subjecting the emulsions to the action of a demulsifying agent comprising the reaction product of:

Blau gas tar_____ 8 parts
Sulphuric acid_____ 3 parts

30. A process for breaking and separating petroleum emulsions characterized by subjecting the emulsions to the action of a treating agent comprising the reaction product of Blau gas tar, sulphuric acid, and cresylic acid.

31. The process of preparing a demulsifying agent of the class described which consists in reacting a Blau gas tar with sulphuric acid.

32. A demulsifying agent for resolving hydrocarbon emulsions which consists in the product resulting from adding sulphuric acid to Blau gas tar which has been formed in the presence of alumina, in relative proportions of substantially eight parts of said tar to three parts of sulphuric acid.

33. A process for resolving hydrocarbon emulsions which consists in feeding into the emulsions a demulsifying agent prepared by sulphonating highly unsaturated hydrocarbons of the polyolefine series.

WILLIAM B. LERCH.